US012533274B2

(12) United States Patent
Slaboch et al.

(10) Patent No.: US 12,533,274 B2
(45) Date of Patent: Jan. 27, 2026

(54) PATIENT REPOSITIONING SYSTEM AND METHOD

(71) Applicant: Larand LLC, Naperville, IL (US)

(72) Inventors: Randall J Slaboch, Naperville, IL (US); Lara Pertile, Downers Grove, IL (US)

(73) Assignee: Larand LLC, Naperville, IL (US)

( * ) Notice: Subject to any disclaimer, the term of this patent is extended or adjusted under 35 U.S.C. 154(b) by 131 days.

(21) Appl. No.: 18/390,185

(22) Filed: Dec. 20, 2023

(65) Prior Publication Data

US 2024/0207120 A1 Jun. 27, 2024

Related U.S. Application Data

(60) Provisional application No. 63/435,249, filed on Dec. 24, 2022.

(51) Int. Cl.
*A61G 7/10* (2006.01)
*A61G 7/05* (2006.01)

(52) U.S. Cl.
CPC ......... *A61G 7/1019* (2013.01); *A61G 7/0506* (2013.01); *A61G 7/1044* (2013.01)

(58) Field of Classification Search
CPC ...... A61G 7/10; A61G 7/1013; A61G 7/1019; A61G 7/1023; A61G 7/1044; A61G 7/0506; A61G 7/0525; A61G 7/1025; A61G 7/1026; A61G 7/1036; A61G 7/1038; A61G 7/104; A61G 7/1049; A61G 7/1051
See application file for complete search history.

(56) References Cited

U.S. PATENT DOCUMENTS

| | | | | |
|---|---|---|---|---|
| 3,894,303 A * | 7/1975 | Angel | A61G 7/1019 | |
| | | | 297/DIG. 10 | |
| 4,843,665 A * | 7/1989 | Cockel | A61G 7/0005 | |
| | | | 5/81.1 R | |
| 5,539,941 A * | 7/1996 | Fuller | A61G 7/1055 | |
| | | | 5/85.1 | |
| 6,964,070 B2 * | 11/2005 | Hawk | A61G 7/1076 | |
| | | | 5/81.1 R | |
| 9,192,535 B2 * | 11/2015 | Sverdlik | A61G 7/1044 | |
| 10,772,778 B2 * | 9/2020 | Hahn | A61G 7/1017 | |

(Continued)

FOREIGN PATENT DOCUMENTS

WO PCT/US23/85033 6/2024

OTHER PUBLICATIONS

Written Opinion of the International Searching Authority, PCT/US23/85033, Jun. 26, 2024.

*Primary Examiner* — David E Sosnowski
(74) *Attorney, Agent, or Firm* — Depeng Bi; The Law Offices of Konrad Sherinian, LLC

(57) ABSTRACT

A patient repositioning system intended for a patient confined to a bed for an extended time period. The repositioning system includes a sling attached to a frame with side poles having head and foot segments that passively fold between a flat/supine position and sitting positions. The frame pivotally mounts to a frame base that is anchored or affixed to a bed. The frame can be pivotally lifted off of a bed mattress, either uniformly by a single-actuator lifter raising both frame poles by the same angle, or so as to tilt the frame to assist with turning a patient by a dual-actuator lifter raising the frame poles to different angles.

16 Claims, 6 Drawing Sheets

(56) References Cited

U.S. PATENT DOCUMENTS

| | | | | |
|---|---|---|---|---|
| 11,654,067 | B2 * | 5/2023 | Harper | A61G 7/1017<br>5/87.1 |
| 2008/0201843 | A1 * | 8/2008 | Bendele | A61G 7/1026<br>5/83.1 |
| 2008/0216232 | A1 * | 9/2008 | White | A61G 7/1074<br>5/87.1 |
| 2009/0249544 | A1 * | 10/2009 | Palay | A61G 7/1036<br>5/89.1 |
| 2012/0124745 | A1 * | 5/2012 | Heimbrock | A61G 7/015<br>5/618 |
| 2020/0078243 | A1 * | 3/2020 | Berg | A61G 7/1055 |

* cited by examiner

PATIENT REPOSITIONING SYSTEM AND METHOD

CROSS-REFERENCE

This application claims the priority benefit of U.S. provisional patent application No. 63/435,249, filed Dec. 24, 2022 and entitled PATIENT REPOSITIONING SYSTEM AND METHOD, the entire contents of which are hereby incorporated by reference herein for all purposes.

FIELD OF THE DISCLOSURE

The present disclosure relates to support slings, lifting apparatus, and methods of repositioning a human bed occupant, particularly a patient confined to a bed for extended time period(s) with limited mobility.

BACKGROUND

Prolonged bed rest without adequate mobilization is often associated with increased risk of pressure ulcers and/or injuries, pulmonary complications including hypoxia and atelectasis, and hospital-acquired infections such as ventilator-associated pneumonia. Pressure ulcers are a type of injury that breaks down the skin and underlying tissue when an area of skin is placed under constant pressure (either shear, compression or a combination of the two) for a certain period, causing tissue ischemia, cessation of nutrition and oxygen supply to the tissues and eventually tissue necrosis. In short, distortion or deformation damage results from pressure sustained over an extended time period. Pressure ulcers caused by pressure due to excessive duration of little or no movement can take an exceedingly long time to heal as well as add significant cost to the provider. To reduce the risk of these ailments for patients unable to mobilize themselves sufficiently, treatment has often included caregivers manually repositioning patients at regular intervals. In other cases, automated components such as powered articulating frames and inflatable bladders have been integrated into patient support apparatus to vary pressure over areas of a patient's body.

Present treatment options for pressure ulcers include various approaches of cleaning the wound, debridement, optimized dressings, role of antibiotics and reconstructive surgery. The newer treatment options such as negative pressure wound therapy, hyperbaric oxygen therapy, cell therapy have been discussed, and the advantages and disadvantages of current and newer methods have also been described.

However, replacing an existing bed with such apparatus can be expensive and labor intensive. In addition, an apparatus that merely varies pressure from under a patient's body may fail to provide certain benefits associated with a caregiver manually turning the patient, such as increased airflow, improved fluid drainage, increased blood flow, and reduced temperature and maceration at areas of a patient's body that are shifted entirely away from contact with a mattress or other support surface when the patient is turned.

SUMMARY

According to an aspect of the disclosure, a human patient repositioning lifter system comprises a lifter and a patient support frame. The lifter comprises a lifter frame; a pair of linear actuators, each linear actuator comprising an elongate fixed member and an elongate extension member, the linear actuator being operable to extend and retract by moving the extension member in opposed linear extension and retraction directions to extended and retracted positions, the linear actuator fixed members being mounted to the lifter frame at laterally spaced apart locations and so that the extension direction of each extension member is oriented upward; and an elongate suspension bar, the linear actuator extension members being connected to the suspension bar at laterally spaced apart extension member connection points on the suspension bar. The patient support frame is connected to a bed frame and positioned over a mattress on the bed frame, the bed frame having a length and a width, the length extending in a longitudinal forward direction to a foot end and in a longitudinal rearward direction to a head end opposite the foot end, and the width extending between opposite lateral sides in a transverse horizontal direction perpendicular to the longitudinal direction. The patient support frame comprises a base, the base being affixed to a foot end of the bed frame; a pair of elongate, lateral support members, the lateral support members having foot ends pivotally connected to the base for pivotal movement in a vertical longitudinal plane; and a head board, the lateral support members having head ends affixed to laterally spaced apart connection points on the head board. The lifter frame is horizontally movable on a floor surface to a use position, the suspension bar in the use position being disposed above and spanning the width of the bed frame, and the bed frame width being disposed medially between the linear actuators in the use position. The suspension bar comprises a pair of load connection points, each load connection point being connected to a respective one of a pair of lateral support members of the patient support frame, so that when the linear actuators extend to raise the suspension bar, thereby raising the load connection points, the respective lateral support members are pulled upwardly so as to pivot the lateral support members upwardly and forwardly in the vertical longitudinal plane.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

Figure 1:
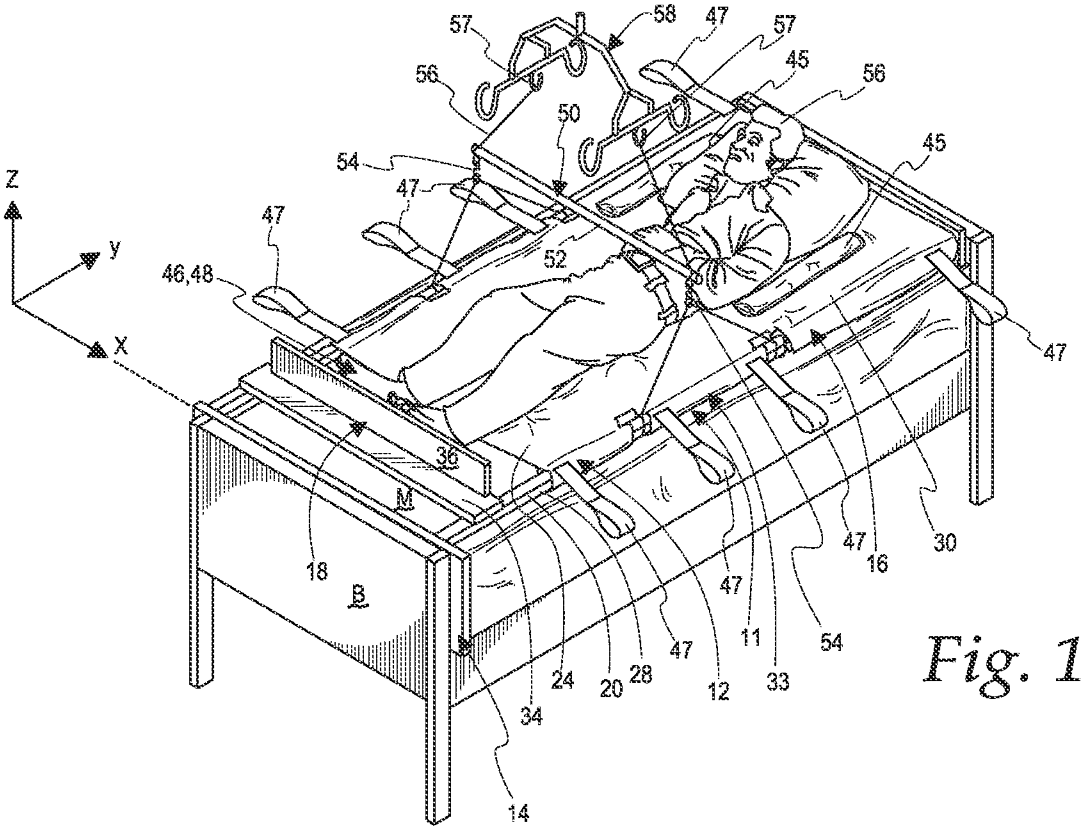
FIG. 1 is a perspective view of a patient repositioning system according to an embodiment of this disclosure.

A person of ordinary skill in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skills in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of various non-limiting examples of embodiments of the disclosed systems and methods, reference is made to the accompanying drawings, which form a part hereof, and in which are shown by way of illustration various example devices, systems, and environments in which aspects of the disclosed systems and methods can be practiced. Other specific arrangements of parts, example devices, systems, and environments can be used, and structural modifications and functional modifications can be made without departing from the scope of the disclosed systems and methods.

As illustrated in the accompanying drawings and described herein, the present disclosure provides a patient repositioning system for shifting the weight of a patient on prolonged bed rest bed with limited self-mobility. The system includes a support assembly and a lifter apparatus, the support assembly being disposed between the patient and a mattress on the bed, and the lifter apparatus being operative to lift at least a portion of the support assembly so as to shift the patient's weight from the mattress to the support assembly. More particularly, the support assembly includes a frame and a sling attached to the frame. The frame can include an assembly of interconnected frame members that is movably connected to a fixed base. For example, such interconnected frame members can be frame poles and a headboard as described herein, the frame poles being connected between a headboard, and the base. A footboard can be adjustably connected to the frame, such as by connecting to the frame poles at a selected position along their lengths, illustrated here as being selected from a continuous range of available positions, but which in other embodiments could be a finite number of positions distributed along the lengths of the frame poles. The sling, headboard, base, and footboard, can constitute (sub)assemblies unto themselves, being constructed from multiple parts as in the illustrated embodiment. In other embodiments, one or more of them can be formed in one piece. In one illustrated embodiment, the system further includes an adapter assembly, referred to below as a spreader bar adapter assembly, which is operative to connect between an existing spreader bar of a lifter apparatus and the support assembly so as to lift the support assembly in a desired manner. Intended to be used for bed bound patients having the propensity to develop pressure ulcers, this newly designed device modifies localized pressure in the areas normally prone to restricted blood flow when a patient is not capable of repositioning under their own power; thus aiding the prevention and/or healing of pressure sores/ulcers. Further beneficial effects include increased airflow in the patient's midsection, lowered skin temperatures, as well as potentially increased pressure to the legs and feet.

A patient repositioning system 10 as illustrated in the accompanying drawing figures will now be described. As shown in FIG. 1, the system 10 includes a support assembly 11 for use with a bed B, the support assembly 11 being adapted and configured to be raised with a patient supported thereon, by a separate external lifter, so as to lift all or a portion of the patient's weight off of the bed B. The support assembly 11 comprises a pivoting patient support frame 12 with lateral and head support members, a pivotal support frame base 14, a sling 16, and a foot support 18. More particularly, the support frame 12 (best seen in FIGS. 4-5) comprises a pair of elongated folding frame poles 20 as lateral support members, each frame pole 20 being pivotally connected to the frame base 14, and a frame head board 22 as a head support member, the frame head board 22 being connected to the frame poles 20, while the sling 16 (best seen in FIG. 7) includes a flexible sheet 24 connected to and extending between the frame poles 20. Beneficially, the flexible sheet 24 can include an interior mesh region 26 made of a material that is bi-directionally stretchable and air and water permeable, so as to allow cooling airflow to reach a supported area of a patient's body, as well as drainage of bodily fluids through the region 26. In addition, the flexible sheet can include an integral elastic lumbar strap 43, comprised of a stretch type fabric (e.g., elastic) that is adapted and configured to be disposed in contact with the lumbar region of the back of a patient supported on the sling 16 and operative to prevent or reduce transitional stresses across the back.

The frame base 14 is operative to be anchored or affixed to a foot end of a bed or bed frame B, such as using well-known tie-down straps as shown in FIG. 1. The pair of frame poles 20 being pivotally connected to the frame base 14 at their respective forward ends 25 in a removable manner (for example by a pivotal joint with a removable pin/bolt), so as to be disposed above a mattress M on the bed B. With reference to the perpendicular x, y and z axes shown in FIGS. 1-4, the frame poles 20 are connected to the frame base 14 so as to extend away from the frame base 14 generally in a longitudinal positive y direction, away from the foot end and toward a head end of the bed B. The frame pole forward ends 25 are spaced apart from each other in a horizontal lateral (x) direction, by a fixed distance. Each frame pole 20 is pivotable relative to the frame base 14 in a vertical longitudinal pivotal plane parallel to the y-z plane. The frame head board 22 is connected, preferably removably, to a rearward end 27 of each frame pole. More particularly, the frame head board 22 has a pair of laterally spaced apart openings 23 that are adapted and configured to receive and removably retain the rearward ends 27 spaced apart from each other at a fixed distance. Still more particularly, each frame pole 20 has a transverse groove 21 formed on its underside so that, when the head board 22 is slid over the frame poles 20 to the position of the groove 21, a thickness of the frame head board 22 at the bottom of each opening 23 is permitted to slot into the groove 21 to prevent the head board 22 from slipping longitudinally out of position. Still more particularly, the fixed lateral spacing between the forward ends 25 of the frame poles 20 can be the same or approximately the same as the fixed spacing between their rearward ends 27. In embodiments, the fixed spacing between the rearward ends 27 can be slightly larger, so that a width of the frame 12 tapers outwardly towards its head end.

Figure 4:
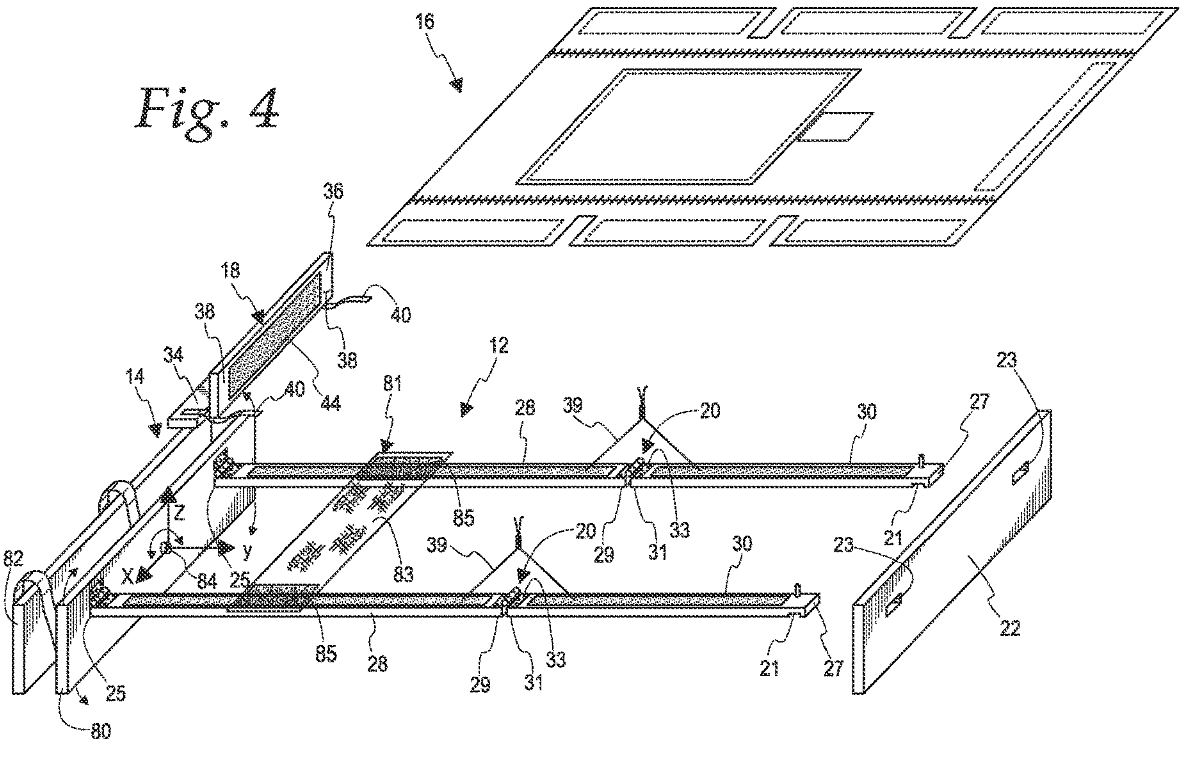
FIG. 4 is a partially exploded perspective view of a frame of the system of FIG. 1.
Figure 5:
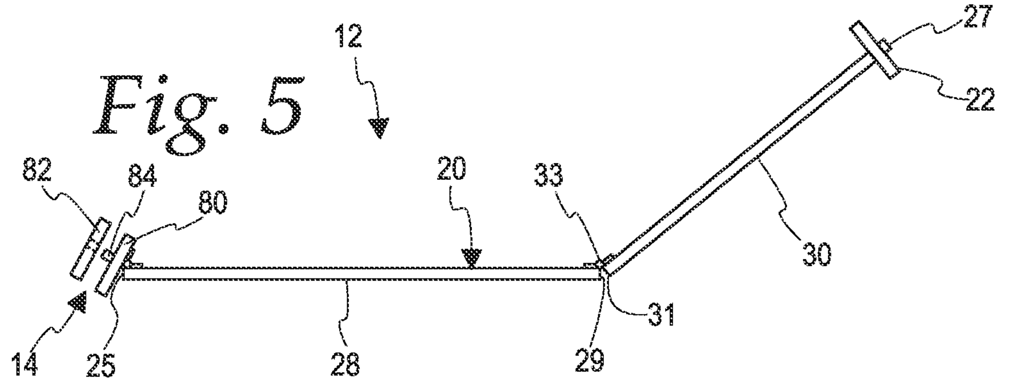
FIG. 5 is a side-elevation schematic view showing the articulation of the frame shown in FIG. 4.

As best seen in the detailed perspective and side-elevation schematic views of the support frame 12 in FIGS. 4 and 5, respectively, each frame pole 20 comprises a foot (i.e., forward) segment 28 and a head (i.e., rearward) segment 30. The foot segment 28 extends from the frame pole forward end 25 to a rearward end 29 of the foot segment 28, where the foot segment rearward end 29 meets a forward end 31 of the head segment 30, the head segment 30 extending from the head segment forward end 31 to the frame pole rearward end 27. Each head segment 30 is pivotally connected to the corresponding foot segment 28 by a frame pole joint 33, so as to pivot upwardly and forwardly from a supine (unfolded, flat) position to a range of sitting (partially folded) positions relative to the foot segment 28. The head segment 30 in its supine position is aligned (that is, generally coaxial, such as within five degrees of coaxial, or more preferably within two degrees of coaxial) with the foot segment 28. In addition, the pivotal joint 33 between the head segment 30 and foot segment 28 is operative to stop further downward pivoting of the head segment 30 past its supine position, such as by respective end faces of the head segment 30 and foot segment 28 abutting in the supine position of the joint 33.

Figure 7:
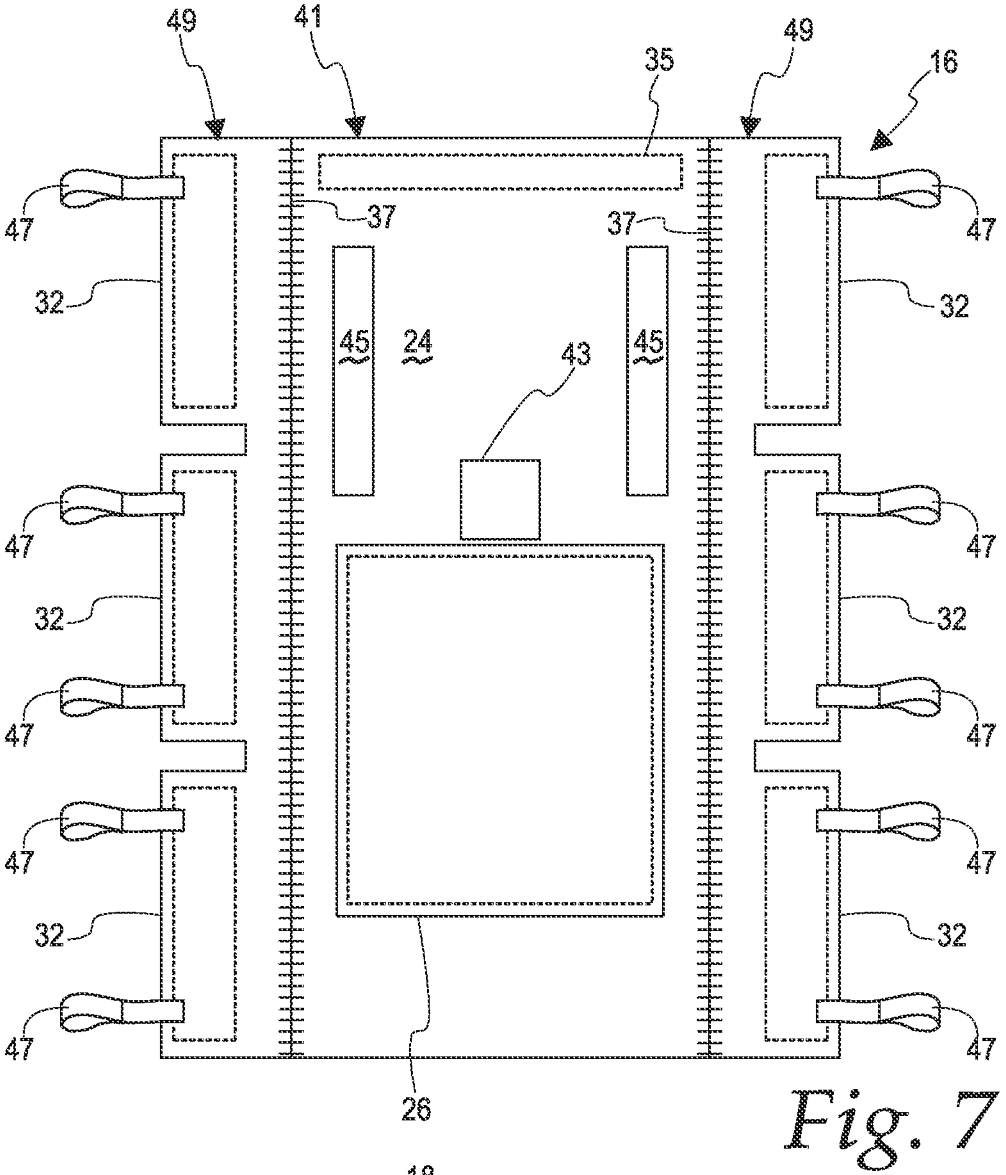
FIG. 7 is a top view of a sling for use with the repositioning system of FIG. 1.

The sling 16 is shown in detail in FIG. 7, including the aforementioned flexible sheet 24 which comprises the interior mesh region 26 and elastic lumbar strap 43, as well as lateral connecting regions 32, a head end connecting region 35, a pair of lateral stabilizer cushions 45, and a set of hanging straps 47 attached at points along each lateral side, described here. Lateral sides of the sling 16 are attached to the foot segment 28 and to the head segment 30 of each frame pole 20, and a head end of the sling 16 is attached to the frame head board 22. When attached, the sling 16 spans a lateral spacing between the foot segments 28 and a lateral spacing between the head segments 30, while extending longitudinally along substantially an entire length of the head segments 30 and partway along a length of the foot segments 28.

In the illustrated embodiment, lateral connecting regions 32 of the sling 16 are placed over the foot and head segments 28, 30 along corresponding portions of their respective lengths and retained by hook-and-loop (such as Velcro® or similar) type fasteners. Likewise, the head end connecting region 35 of the sling 16 is similarly placed over and connected to the frame head board 22 by a hook-and-loop fastener connection. Complementary patches of the hook-and-loop type fasteners are affixed respectively to the sling connecting regions 32, 35 (such as by stitching) and to the corresponding members of the frame 12 (such as by adhesive). In other embodiments of a support assembly, a sling can be attached to a frame using any other suitable method, including but not limited to grommets over hooks imbedded in the poles, a rope or ropes threaded and/or tied between the sling and frame, or other such devices.

The lateral stabilizer cushions 45, which may, for example, be formed as fabric tubes filled with a soft material (e.g., cotton or other batting material), attached to a top side of the flexible sheet 24 by suitable means such as hook-and-loop fasteners or stitching, provide raised soft obstructions to restrain sliding movement of a person supported on the sling 16 when the sling is tilted to one side in accordance with a system and method of the disclosure.

The hanging straps 47 can be, for example, straps of nylon or polyester webbing stitched at one end to a lateral side of the sling 16, each folded over and stitched to itself at an opposite end to form a loop or eyelet. Straps 47 attached to the sling 16 at a plurality of points along each lateral side, such as four points as shown in FIG. 1 or five points as shown in FIG. 7, can be used to suspend a person supported on the sling 16, with or without the sling being attached to the frame poles 20. In particular, the looped ends of the hanging straps 47 can hook onto attachment points of a spreader bar of an existing lifter, such as the spreader bar 58 shown in FIG. 1 or similar. For example, all the loops on each side can hang from a single attachment point of the spreader bar on that side. When using two spreader bar attachment points on each side (four total), one spreader bar attachment point can be shared by the two loops towards the head end, and the other can be shared by the two loops towards the foot end. When using three spreader bar attachment points on each side (six total), the corner loops on each side can by hooked onto corner attachment points, and the two middle loops on each side can share a middle attachment point on the respective side of the spreader bar.

The lateral connecting regions 32 extend longitudinally over substantially an entire length of each lateral side of the sling 16, with gaps provided to accommodate a respective pair of attachment points of a lifting harness 39 of each frame pole 20, each of which connects to a suitable lifter for lifting a patient on the support assembly 11 according to systems and methods described in more detail below. When attached to the frame poles 20 in this manner, the sling 16 is operative to bear all or substantially all of a patient's weight, and to transmit the patient's weight to the frame poles, without the sling 16 breaking or its connecting portions separating from the frame poles 20.

When the support assembly 11 is passively in place under a patient on the bed B (that is, when the lifter is disconnected and/or not applying any lifting force) so that the frame 12 is not bearing any of the patient's weight, it can be desirable to move one or both frame poles 20 out of the way to provide a caregiver unobstructed access to a patient's side(s). To facilitate this access, one or both lateral connecting regions 32 of the sling 16 can be removable from a central section 41 of the sling 16 that includes the flexible sheet 24. In the illustrated embodiment, the sling 16 comprises a pair of quick-disconnect lateral sections 49, each lateral section 49 comprising the connecting regions 32 of the respective lateral side of the sling 16 and being removably connected to the central section 41 along its respective lateral side by a zipper 37. Similarly, the head end connecting region 35 can also be conveniently removable from the central region of the sling 16, by a zipper or other suitable removable connection (removable connection not shown). Either frame pole 20 can thus be freed from the flexible sheet 24 without detaching the connecting regions 32 from the frame pole 20, by simply unzipping the corresponding zipper 37 and sliding the frame head board 22 off of the frame pole 20 (if necessary, first freeing the frame head board 22 from the flexible sheet 24 before sliding it off of the frame pole 20, by detaching the head end connecting region 35 of the sling from the frame head board 22, or in other embodiments not shown, from the central section 41 of the sling 16). This allows the selected frame pole 20 to be pivoted forwardly away from the flexible sheet 24, independently of the other frame pole 20 and the frame board 22, or to be removed entirely by further disconnecting the frame pole 20 from the base 14, thus providing a caregiver unobstructed access to the corresponding side of a patient on the flexible sheet 24. Alternatively, both lateral sections 49 of the sling 16 can be disconnected from the central section 41, and either the head end connecting region 35 of the sling detached from the frame head board 22, or in embodiments not shown, a head end section of the sling comprising the head end connecting region 35 similarly disconnected from the central section 41, thus freeing the entire patient support frame 12 to be pivoted forwardly away from the flexible sheet 24 as a unit, for access to a patient thereon from three sides, without the need to slide the frame head board 22 off of either frame pole 20. In other embodiments of a support assembly according to this disclosure, a sling can connect to the frame poles and head board using other suitable connectors and/or other suitable techniques as known in the art.

In embodiments, the support assembly is constructed in appropriate dimensions and of suitable materials to be able to lift individuals of different weight (such as a three-hundred-pound person or a four-hundred-pound person) supported on the sling to a position in which the sling initially loses contact with a top side of a mattress, so as to shift all of the person's weight off of the mattress and provide a small air gap, such as a one-inch air gap, between the sling and the mattress. Without limitation, suitable materials for base, frame poles, and headboard include metal, wood, PVC, and similar materials. For example, the foot and head segments 28, 30 can be 1.5-inch by 0.75-inch extruded aluminum bars, connected by a suitable hinge (such as a marine hinge) fastened to their adjacent top sides. The segments 28, 30 can have lengths of, for example, about forty-six inches and thirty-three inches, respectively, so that the frame poles 20 have a total length of about seventy-nine inches. The sling 16 can be constructed of canvas and/or felt, with the interior region 26 comprising a suitable mesh fabric or other breathable and liquid permeable material, and the elastic lumbar strap 43 comprising any suitable stretch material.

When the sling 16 is attached to the frame poles 20 and frame head board 22 as described, the flexible sheet 24 is operative to extend over a sufficient area of a back side of a patient's body to comfortably lift the patient's weight entirely off the bed B, preferably so that the bottom side of the sling is just out of contact with the top side of the mattress at the lowest point where the top side of the sling touches the patient's body. More particularly, the flexible sheet 24 covers a large enough area to extend from below the patient's buttocks to above the patient's head when the patient is supported on the mattress, with the joints of the frame poles 20 approximately aligned with the patient's hip joints, when the patient is supported on the mattress as well as when the patient is suspended above the mattress and supported on the sling 16. Still more particularly, the flexible sheet 24 extends from below the patient's knees (such as from a mid-calf region or lower) to above the patient's head when the patient is so positioned.

Figure 6A:
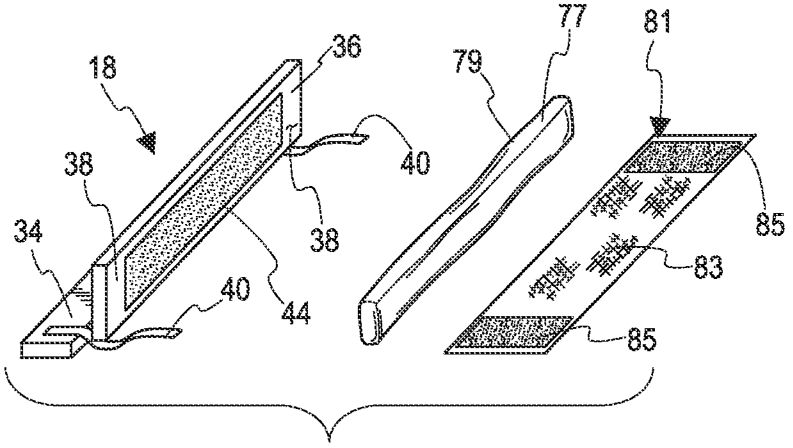
FIG. 6A is a perspective view of a foot support, foot support cushion, and lower leg/ankle/heel support sheet for use with the repositioning system of FIG. 1.
Figure 6B:
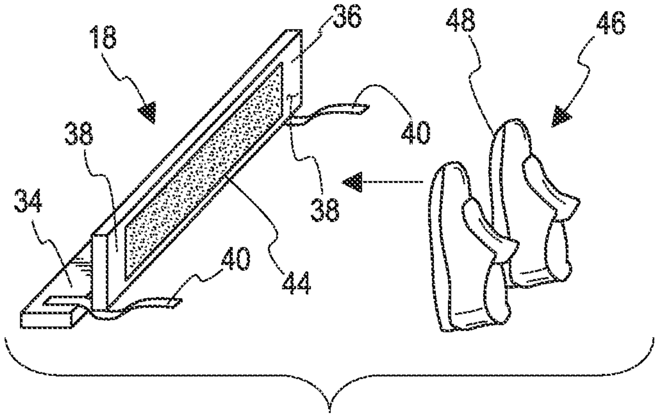
FIG. 6B is a perspective view of a foot support and footwear for use with the repositioning system of FIG. 1.

As seen in the detailed view of the frame 12 of FIG. 4, and illustrated separately in FIGS. 6A and 6B, the foot support 18 comprises a mounting segment 34, a foot engaging segment 36 connected to the mounting segment 34, and a pair of integral connecting straps 40. When the foot support 18 is connected to the frame poles 20, the mounting segment 34 is operative to engage the foot segments 28 of the frame poles 20, with the foot engaging segment 36 extending upwardly from the mounting segment 34, so as to provide a foot engaging surface 38 intended to keep the person's heels off the mattress in a comfortable position. More particularly, the mounting segment 34 comprises a generally downward-facing mounting area on its bottom side to be placed on a complementary shaped (for example, both areas can be flat) upward facing area of a top side of the foot segment 28 of each frame pole 20. The position of the foot support 18 is continuously adjustable, in that it is able to be removably attached to the top side of the foot segments 28 at a continuous range of desired longitudinal positions. Each of the connecting straps 40 is connected to the foot segment 28 of the corresponding frame pole 20. In the illustrated embodiment, the connecting straps 40 comprise hook-and-loop patches complementary to patches affixed to the foot segments 28, the latter of which can be formed as contiguous lower portions of the same patches used to connect the leg segments 28 to the lateral connecting regions 32 of the sling 16, thus permitting the foot support 18 to be connected anywhere along a continuously adjustable range of longitudinal positions from the frame base 14 to the sling 16. In use, the foot engaging surface 38 extends upwardly and/or forwardly away from the foot segments 28 in a heel-to-toe direction of a patient who is supine or seated on the sling 16. The heel-to-toe direction can be perpendicular or approximately perpendicular to a plane of the foot segments 28. In other embodiments of a foot support, a separate sling can be attached to a frame to support the feet above the top side of a mattress without touching the feet, for example by supporting a posterior side of the lower leg (i.e., the leg below the knee and above the heel, including some part of the ankle, calf, or both) positioned on the separate sling. The separate sling can be attached to the frame by any suitable method, including but not limited to those described for attaching the previously described upper body supporting sling (sling 16 in the illustrated embodiment). One example of this type of foot support is the lower leg support 81 introduced further below.

Figure 8:
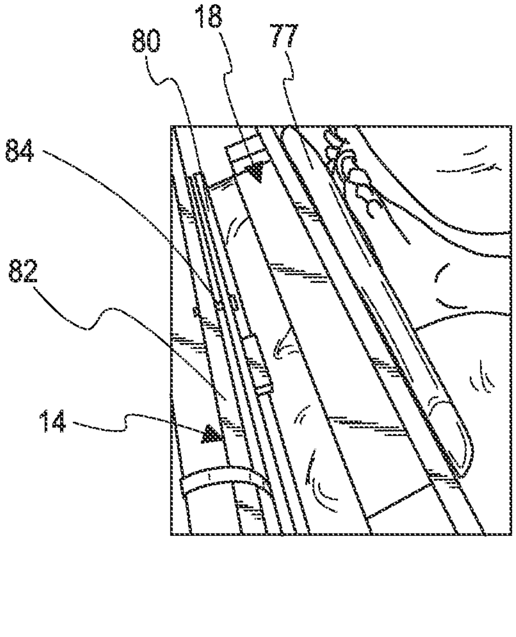
FIG. 8 is a top-left-head-end view of a tilting base of the repositioning system of FIG. 1.

In addition, the foot support 18 further comprises a hook-and-loop fastener patch 44 formed on its foot engaging surface 38. According to an embodiment illustrated in FIGS. 4, 6A and 8, the patch 44 can be used in conjunction with a foot support cushion 77 (FIGS. 6A, 8), the foot support cushion 77 having a complementary hook-and-loop fastener patch on a forward side 79 for attachment to the patch 44 on the foot engaging surface 38 to support the soles of a patient's feet (FIG. 8), while the posterior side of the patient's lower legs and/or ankles can be supported on a lower leg support sheet 81 comprising a central support region 83 (shown as being formed of a mesh material) and lateral fastener regions 85 (shown as comprising hook-and-loop fastener patches) connected to the support regions for fastening the lower leg support sheet 81 to the frame poles 20 forwardly of the sling 16. This embodiment has the benefit of removing all pressure from a patient's heels, as illustrated in FIG. 8 (truncated so as to omit the lower leg support sheet 81, which, however, will be understood to be attached to the frame 12 as illustrated in FIG. 4, so as to be disposed under/behind the posterior side of the legs of the patient whose feet are positioned as shown in FIG. 8). Optionally, as illustrated in FIG. 4, the foot support 18 can be employed without the cushion 77, as a patient's feet can be padded by appropriate footwear (not shown) in lieu of a cushion, the footwear being free of a sole-side attachment feature. In addition, the lower leg support 81 can be employed without the foot support 18, so as to permit the patient's heels to be suspended freely over the mattress M when the patient's lower legs are supported on the mesh support region 83. According to another embodiment illustrated in FIG. 6B, the patch 44 can be used in conjunction with footwear 46 to be worn on the patient's feet, the footwear 46 having complementary hook-and-loop fastener patches formed on a sole side 48. When a patient wearing the footwear 46 places the sole 48 on the foot engaging surface 38, the footwear 46 provides holding forces tangential to and away from the foot engaging surface 38, which supplement a normal contact force inherently provided by a rigid structure of the foot support 18, to support variously directed load vectors resulting from the combination of the patient's weight and muscle activity, such as shearing or friction.

According to aspects of the present disclosure, a support assembly can be used: (A) For patient transfer, in conjunction with various suitable external lifting devices; (B) For patient repositioning from a mattress to a sling in conjunction with various suitable external lifting devices; and (C) For patient repositioning from a mattress to a sling and tilting the sling to a desired side, in conjunction with an external lifting device according to this disclosure. A lifting device suitable for use according to aspect (A) or (B) can be any one of a variety of interchangeable automated external lifters, including existing lifters, such as any of several patient lifts available under the names Hoyer, Liko, Invacare, and others. A suitable lifter typically includes a lifter base, at least one motor/motive device, and at least one spreader bar that is driven up and down by the motive device. The spreader bar is operative to connect to the support assembly and to transmit a lifting force from the motive device to the support assembly to raise the support assembly with a patient supported thereon. The motor or motive device can be electromagnetic, hydraulic, pneumatic, or of any other suitable type.

(A) For patient transfer operations, the support assembly is attached to the spreader bar of the external lifter. The support assembly as disclosed herein can be used with 2, 4, or 6 attach points of the external spreader bar.

(B) When used with an external lift for patient repositioning, the external spreader bar of the lifter is connected to each of a pair of frame poles of the support assembly, so that the motive device is operative to transmit a lifting force through the load member to the frame poles, so as to increase a forward angle of inclination of at least a pair of lower/foot segments of the frame poles (or if the patient is initially supine, so as to increase a forward angle of the foot segments and that of a pair of head segments, each head segment being connected to the respective foot segment so as to be foldable from a flat/supine position only to sitting positions at forward angles relative to the foot segments and unfoldable from the sitting positions to the flat/supine position, substantially as in the illustrated embodiment described above) relative to the top side of the mattress on the bed frame, so as to transfer at least a portion of the patient's weight from the mattress to the support assembly. More particularly, the external spreader bar is operative to transfer all of the patient's weight from the mattress to the support assembly. Still more particularly, the external spreader bar is operative to transfer all of the patient's weight from the mattress to the frame poles, primarily through a sling attached to each of the frame poles, and preferably at least partly through a foot support attached between the frame poles below/forwardly of the sling (i.e., between the sling and the foot ends of the frame poles). In embodiments of the aspects (A) and (B), a spreader bar adapter assembly as disclosed here is connected between the support assembly and an existing lifter, the spreader bar adapter assembly including an adapter spreader bar and means of connecting the adapter spreader bar to the support assembly and to the external spreader bar of the lifter. The spreader bar adapter assembly so connected can be lifted by the lifter while lifting the support assembly, the adapter spreader bar serving to provide a particular desired arrangement of connection points for the support assembly that is not present in the external spreader bar, such as a pair of connection points that are spaced apart laterally by approximately the width of the support frame.

(C) When using the lifting device described herein, the additional advantage of pivoting the frame in a tilting direction once raised serves to shift or turn a patient's body onto or toward one of the patient's sides, thereby decreasing the pressure at areas nearer to the patient's opposite side to as little as zero (at areas that visually are no longer touching, or being touched by, a surface) and increasing blood flow to areas where pressure is reduced or eliminated.

In an embodiment of a patient repositioning system and method according to this disclosure, as illustrated in FIG. 1, the system 10 further includes a spreader bar adapter assembly 50 for use in connecting an existing lifter to the support assembly 11. The adapter assembly 50 comprises an elongated adapter spreader bar 52, a pair of suitable connectors 54 for the support assembly (illustrated as hooks) on a bottom side of the adapter spreader bar 52, and a suitable connector or connectors 56 for the external spreader bar of an existing lifter (illustrated as a pair of adapter cables) on a top side of the adapter spreader bar 52. The adapter spreader bar 52 maintains a desired separation distance between the attachment points of the connectors 54.

More particularly, as mentioned previously, each frame pole 20 includes an integrated lifting harness 39 (illustrated as a cable harness assembly, while other types of lifting connectors are possible, while a flexible and/or collapsible tension linkage is preferred, such as a strap, cord, band, rope, chain, or a combination thereof, so that the lifting connector does not inhibit the patient support frame from being passively lifted and/or folded up to a sitting position from below, such as when a mattress under the patient support frame is itself raised and/or folded up to a sitting position by a powered bed frame) with lower ends, the lower ends being connected to at least one attachment point on each of the foot segment 28 and head segment 30 (illustrated as one attachment point per segment, but more attachment points are possible in other embodiments), respectively, of the corresponding frame pole 20. The spacing between the connectors 54 corresponds to a width of the support frame 12, allowing each connector 54 to connect to a respective one of the connectors 39 of the assembled support frame 12 and to pull straight up on each frame pole 20 via the connectors 39 while the adapter spreader bar 52 is raised by an external lifter, from which it is suspended by attaching the connectors 56 to a pair of more narrowly spaced apart connecting features 57 of an external lifter spreader bar 58.

Figure 2:
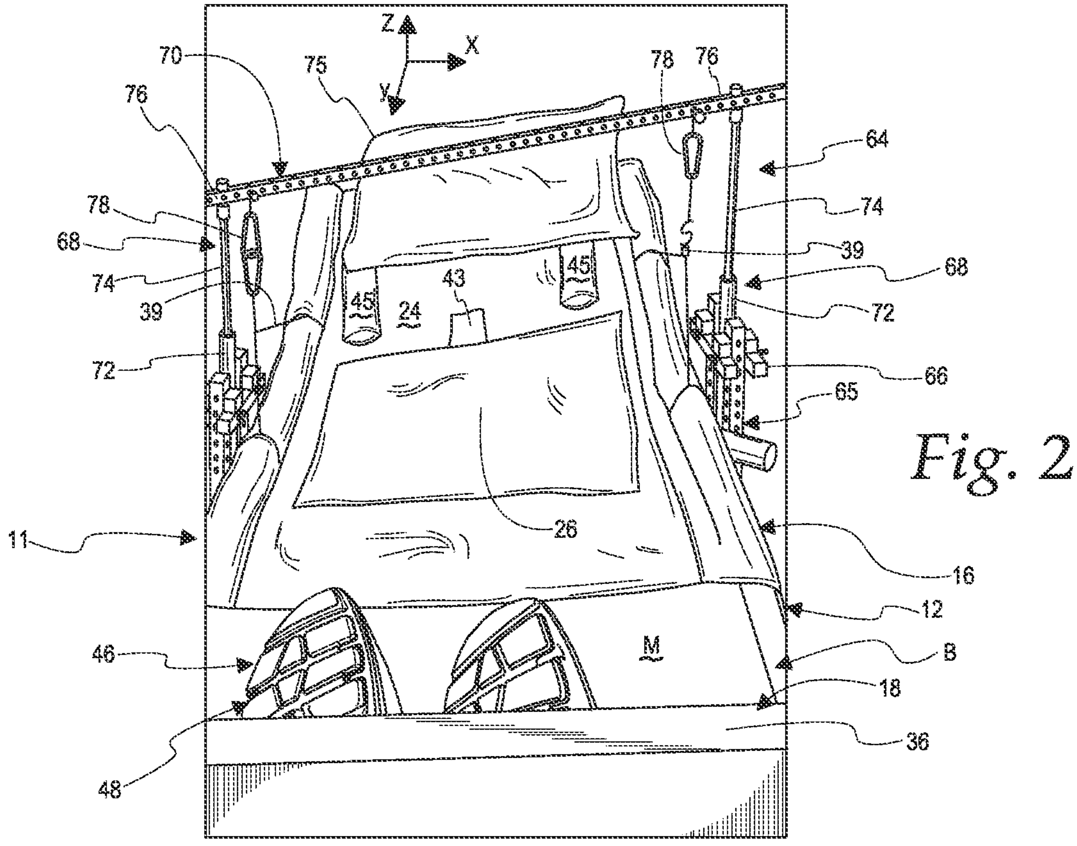
FIG. 2 is a top foot-end view of a lifter according to another embodiment of the disclosure in use with the patient repositioning system of FIG. 1.
Figure 3:
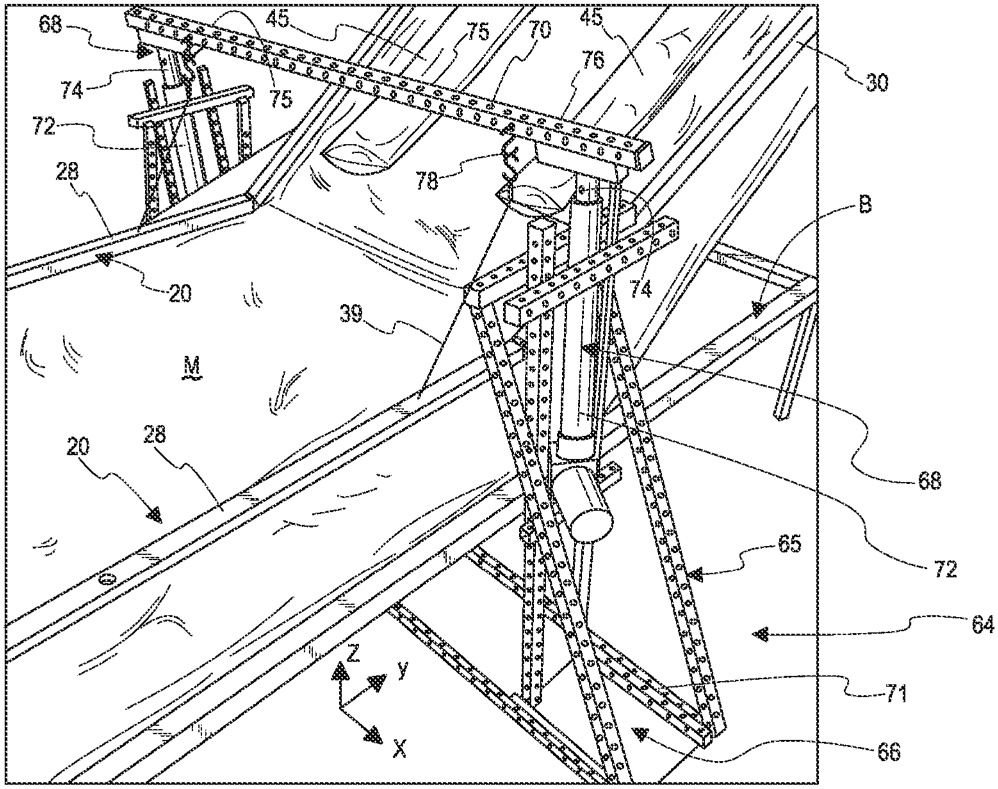
FIG. 3 is side-top view of the lifter shown in FIG. 2.

According to another aspect of the invention, a new lifter is provided for use with a support assembly according to the previously described aspect. In an embodiment shown in FIGS. 2 and 3, a lifter 64 includes a lifter frame 65 and a pair of linear actuators 68 (which can, for example, be pneumatic cylinder components) mounted to the lifter frame 65, and a laterally extending, elongate suspension bar 70 as a lifter load member. The suspension bar 70 is adapted and configured to be disposed above the support frame 12 and to extend generally laterally. The suspension bar 70 has a central region 75 and opposite lateral regions 76 that extend from the central region 75 to opposite lateral ends of the suspension bar 70. The central region 75 spans a portion of the length of the suspension bar 70 approximately equal to the lateral width of the support frame 12 and is adapted and configured to be disposed directly thereabove during typical use, while the opposite lateral regions 76 are adapted and configured to extend laterally beyond the opposite lateral sides of the bed frame B. The lifter frame 65 is sized and dimensioned so as to be positionable in a use position with the actuators 68 disposed at opposite sides of the bed frame B. More particularly, the lifter frame 65 comprises a pair of lifter bases 66, the lifter bases 66 being positionable at opposite sides of the bed frame B, each lifter base 66 supporting a corresponding one of the linear actuators 68. In addition, as shown in FIG. 3, the lifter frame 65 further includes stabilizing lower crosspieces 71 that are adapted and configured to extend below the bed frame B to connect to each of the lifter bases 66. Preferably, the crosspieces 71, which may for example be perforated square metal tubing members, are readily detachable from the lifter bases 66 to permit sliding or wheeling the lifter 64 supported on a floor surface (for which each lifter base 66 can include wheels, not shown) longitudinally away from the bed frame B in the forward or rearward direction past either end of the bed, and conversely, from such a position away from the bed frame B to the use position. If the lifter base 66 includes wheels or other mobile floor-engaging members, it can further include brakes and/or a floor-gripping member or members, to keep the lifter 64, and more specifically the suspension bar 70, centered over the attach point(s) of the patient support frame 12 once moved into position.

Each linear actuator 68 has a corresponding fixed member, illustrated as a cylinder 72, and a corresponding extension member movably connected to the fixed member for movement in opposed linear extension and retraction directions to extended and retracted positions, the extension member in the extended position having a non-overlapping length segment extending distally past a distal end of the fixed member, the extension member in the retracted position having an overlapping length segment extending proximally past the distal end of the fixed member. The extension member is illustrated as a piston 74, the cylinder 72 being connected to and supported on the corresponding lifter base 66, the piston 74 being operative to extend upwardly from and retract downwardly into the cylinder 72 ("upward," "upwardly," "downward," and "downwardly" will be understood to be inclusive of approximately vertical directions, such as within ten degrees, preferably within five degrees, or still more preferably within two degrees of the vertical, positive z direction). The upper ends of the pistons 74 are connected to the suspension bar 70 at laterally spaced apart positions, in the opposite lateral end regions 76 of the suspension bar 70.

A suspension bar according to this disclosure is adapted to be connected to lateral support members of a patient support frame, such as those of the patient support frame 12 of the previously described embodiment. More particularly, a suspension bar can include connectors to connect directly to a harness or the like of each lateral support member, or the suspension bar and the lateral support member can be adapted to connect to a pair of hangers that are in turn connected to the lateral support members so as to transmit tensile loads from the lateral support members to the suspension bar. Such hangers can be constructed as assemblies; thus, a pair of hanger assemblies 78 are shown in FIGS. 2 and 3 as being connected to the suspension bar 70 so that each hanger assembly 78 hangs from the suspension bar 70 in one of the lateral end regions 76, spaced medially (inwardly) from the corresponding piston 74. Each hanger assembly 78 is adapted to be connected to a corresponding lateral support member of a pivotal patient support frame as in a previously described embodiment of the disclosure. so that the lateral support member can be pivoted upward to a vertical angle above a mattress on the bed frame B and suspended from the hanger assembly 78 at various angles of forward inclination, and lowered back onto the mattress, by raising and lowering the hanger assembly 78 to various corresponding vertical positions. More particularly, each hanger assembly 78 is adapted to hook or clip onto an upper end of the lifting harness 39 that corresponds to one of the frame poles 20 of the previously described patient support frame 12.

The linear actuators 68 are operative to extend and retract the pistons 74 out of and into their respective cylinders 72, each independently of the other, so as to independently raise and lower the opposite lateral end regions 76 of the suspension bar 70, either by different amounts or by the same amount of vertical displacement as desired, so as to raise and lower the connectors 39 and their corresponding frame poles 20 by the same amount or different amounts of vertical displacement, and thus to different elevations. As follows, the lifter 64 can thus produce bidirectional rotational adjustments of the frame 12, and the sling 16 supported thereon; that is, pivoting of the frame 12 about a transverse (x) axis and rotation of the distal/head end of the frame 12 about a longitudinal (y) axis.

The first bidirectional rotational adjustment is pivoting of the frame 12 about a transverse (x) axis where the frame pole forward ends 25 are connected to the frame base 14, which effects raising and lowering the angle of inclination of the sling 16 relative to the bed B. Thus, when it is desired simply to shift the weight of a patient off of a mattress and onto the sling 16, the linear actuators 68 can be operated so as to extend and retract the pistons 74 at the same time, by the same amounts, thus raising and lowering the frame poles 20 suspended from the lifting harnesses 39 upwardly and downwardly by equal distances, so as to produce the same change in angle of inclination of each frame pole 20 about the transverse (x) axis. In this manner, the weight of a supine or upright seated patient can be lifted slightly off of the mattress, while remaining approximately centered on the patient's body (e.g., aligned with the patient's spine) and downwardly directed between the frame poles 20.

The second bidirectional rotational adjustment is rotation of the frame 12 about a longitudinal (y) axis, to the right or left side. This effects turning a patient toward that side, and/or laterally shifting the patient's weight so as to laterally shift the distribution of pressure over areas of the patient's body closer to that side. Thus, when it is desired to shift a patient's weight laterally and/or turn a patient, the linear actuators 68 can be operated to extend or retract the pistons 74 by different amounts so as to raise or lower the connectors 39 and their corresponding frame poles 20 by different amounts, which in turn tilts the flexible sheet 24 of the sling 16 toward the lower frame pole 20, as best seen in FIG. 2. To permit the frame 12 to be tilted in this manner without twisting or flexing, the support assembly 11 further includes a y-axis pivotal connection between the frame 12 and bed B. In particular, the frame base 14 of the illustrated embodiment includes a tilting foot board 80 and a fixed anchor board 82, the anchor board 82 being affixed to a foot end of the bed B, the foot board 80 being pivotally connected to the anchor board 82 at a pivotal tilt joint 84 for rotation about the y-axis, and the forward ends 25 of the frame poles 20 being connected to the foot board 80. Operating the lifter 64 in this manner tends to produce a downward incline in a rearward (i.e., upper/head-end with respect to a patient's frame of reference) region of the flexible sheet 24 toward the lower frame pole 20, thereby increasing upward pressure from the flexible sheet 24 over an area nearer the higher frame pole 20, thus tending to roll the patient's body toward the lower frame pole 20. This shifts some of the pressure on the patient's posterior toward the right or left corresponding side, and likewise from a first area of the mattress toward a second area to the right or left of the first area.

The preceding description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A human patient repositioning lifter system comprising
- a lifter;
- a patient support frame;
- the lifter comprising:
  - a lifter frame;
  - a pair of linear actuators, each linear actuator comprising an elongate fixed member and an elongate extension member, the linear actuator being operable to extend and retract by moving the extension member in opposed linear extension and retraction directions to extended and retracted positions;
  - the linear actuator fixed members being mounted to the lifter frame at laterally spaced apart locations and so that the extension direction of each extension member is oriented upward;
  - an elongate suspension bar, the linear actuator extension members being connected to the suspension bar at laterally spaced apart extension member connection points on the suspension bar;
- the patient support frame being connected to a bed frame and positioned over a mattress on the bed frame, the bed frame having a length and a width, the length extending in a longitudinal forward direction to a foot end and in a longitudinal rearward direction to a head end opposite the foot end, and the width extending between opposite lateral sides in a transverse horizontal direction perpendicular to the longitudinal direction;
- the patient support frame comprising:
  - a base, the base being affixed to a foot end of the bed frame;
  - a pair of elongate, lateral support members, the lateral support members having foot ends pivotally connected to the base for pivotal movement in a vertical longitudinal plane; and
  - a head board, the lateral support members having head ends affixed to laterally spaced apart connection points on the head board;
- the lifter frame being horizontally movable on a floor surface to a use position, the suspension bar in the use position being disposed above and spanning the width of the bed frame, and the bed frame width being disposed medially between the linear actuators in the use position;
- the suspension bar comprising a pair of load connection points, each load connection point being connected to a respective one of a pair of lateral support members of the patient support frame, so that when the linear actuators extend to raise the suspension bar, thereby raising the load connection points, the respective lateral support members are pulled upwardly so as to pivot the lateral support members upwardly and forwardly in the vertical longitudinal plane.

2. The patient repositioning lifter system of claim 1 wherein the linear actuators are operable independently, further comprising the load connection points being laterally spaced apart, so that when one or both of the linear actuators are operated so as to extend to different elevations, so as to tilt the suspension bar in a vertical transverse plane perpendicular to the vertical longitudinal plane, the load connection points are moved to different elevations, thereby lifting the lateral support members to different elevations, thereby producing rotation of the patient support frame in a vertical transverse plane perpendicular to the vertical longitudinal plane.

3. The patient repositioning lifter system of claim 2 wherein the patient support frame base comprises a foot board and an anchor board, the lateral support members being pivotally connected to the foot board for said pivotal movement in the vertical longitudinal plane, the foot board being pivotally connected to the anchor board for said rotation in the vertical transverse plane, and the anchor board being affixed to the foot end of the bed frame.

4. The patient repositioning lifter system of claim 1, further comprising a tension linkage connected between the load connection point and the lateral support member, so that the tension linkage is operative to transmit an upward force from the load connection point to the lateral support member.

5. The patient repositioning lifter system of claim 1 further comprising a foot support, the foot support being removably attached to each of the lateral support members between the foot end of a sling of the patient support frame and the base of the patient support frame, wherein the sling comprises a flexible sheet disposed between a pair of lateral sides, a head end, and a foot end, each lateral side of the sling being removably attachable to one of the lateral support members and the head end of the sling being removably attachable to the head board.

6. The patient repositioning lifter system of claim 5 wherein the foot support is removably attachable to each of the lateral support members at any longitudinal position within a continuous range of longitudinal positions.

7. The patient repositioning lifter system of claim 5 wherein the foot support comprises a foot engaging segment, the foot support being adapted and configured to attach to the lateral support members so that the foot engaging segment extends upwardly from the lateral support members and comprises a rear-facing foot support surface.

8. The patient repositioning system of claim 1 wherein the lifter frame further comprises a pair of lifter bases and a lower crosspiece, each linear actuator fixed member being mounted to a corresponding one of the lifter bases, the lower crosspiece being detachably connected to each of the lifter bases, the lower crosspiece being adapted and configured to extend below the bed frame when the lifter frame is in the use position, and the lifter frame with the lower crosspiece detached being operative to be movable in a longitudinal direction on a floor surface from the use position to a position away from the bed frame.

9. A method of repositioning a human patient supported on a mattress using a human patient repositioning lifter system, the method comprising:

affixing a base of a patient support frame of the human patient repositioning lifter system to a foot end of a bed frame so that a pair of elongate lateral support members of the patient support frame are oriented horizontally and disposed on a top side of a mattress on the bed frame, the bed frame having a length extending in a longitudinal horizontal direction from a foot end to a head end and a width extending between opposite lateral sides in a transverse horizontal direction perpendicular to the longitudinal direction, wherein the human patient repositioning lifter system comprises a lifter and the patient support frame, the lifter comprising a lifter frame, a pair of linear actuators, each linear actuator comprising an elongate fixed member and an elongate extension member, the linear actuator being operable to extend and retract by moving the extension member in opposed linear extension and retraction directions to extended and retracted positions, the linear actuator fixed members being mounted to the lifter frame at laterally spaced apart locations and so that the extension direction of each extension member is oriented upward, and an elongate suspension bar, the linear actuator extension members being connected to the suspension bar at laterally spaced apart extension member connection points on the suspension bar, the patient support frame comprising the base, the pair of elongate lateral support members, a head board, and a sling, the lateral support members having foot ends pivotally connected to the base for pivotal movement in a vertical longitudinal plane and head ends connectable to laterally spaced apart connection points on the head board, the sling comprising a flexible sheet disposed between a pair of lateral sides, a head end, and a foot end, each lateral side of the sling being removably attachable to one of the lateral support members and the head end of the sling being removably attachable to the head board;

positioning the sling between the mattress and a patient supported on the mattress so that the flexible sheet extends longitudinally over a back side of the patient's body from below the patient's buttocks to above the patient's head;

attaching the lateral sides of the sling to the lateral support members and the head of the sling to the head board;

connecting each of the lateral support members to a corresponding load connection point on the suspension bar;

extending at least one of the linear actuators so as to raise the elevation of at least one of the load connection points on the suspension bar, so as to raise the elevation of at least a portion of the corresponding lateral support member and the corresponding lateral side of the sling, so as to increase upward pressure on the patient's body from an area of the flexible sheet, so as to reduce downward pressure from the patient's body to an area of the mattress underlying the area of the flexible sheet.

10. The method of claim 9 wherein connecting each of the lateral support members to said corresponding load connection point on the suspension bar comprises connecting a tension linkage between the load connection point and the lateral support member, so that the tension linkage is operative to transmit an upward force from the load connection point to the lateral support member.

11. The method of claim 9 wherein said extending at least one of the linear actuators comprises extending both linear actuators so as to raise the elevation of both load connection points on the suspension bar, thereby pivoting both the lateral support members and both lateral sides of the sling upwardly and towards the foot end of the bed frame in the vertical longitudinal plane until the patient's weight is shifted from the mattress to the sling.

12. The method of claim 11, further comprising further extending the linear actuators until the sling is lifted to a position out of contact with the mattress to provide an air gap between the sling and the mattress.

13. The method of claim 12 wherein the sling is positioned so that the patient's knees are disposed beyond the foot end of the sling, further comprising attaching a foot support to each of the lateral support members between the foot end of the sling and the base of the patient support frame so that, when the sling is so lifted, the patient's lower legs and feet are suspended above the mattress on the lower extremity support.

14. The method of claim 13 wherein attaching said foot support comprises attaching a lower leg support sheet operative to bear against a posterior side of the patient's lower legs when the sling is so lifted.

15. The method of claim 13 wherein attaching said foot support comprises attaching a foot engaging member operative to bear against a heel side of the patient's feet when the sling is so lifted.

16. The method of claim 9 wherein said extending at least one of the linear actuators comprises extending one of the linear actuators more than the other linear actuator so as to raise the elevation of the corresponding load connection point on the suspension bar above that of the other load connection point, so as to raise the elevation of a portion of the corresponding lateral support member above that of the contralateral support member, so as to roll the patient's body toward the contralateral support member, thereby shifting at least a portion of the patient's weight in the contralateral direction from one area of the patient's body to another area of the patient's body and from one area of the mattress to another area of the mattress.

* * * * *